United States Patent [19]

Yamamoto

[11] 3,953,036

[45] Apr. 27, 1976

[54] METHOD OF AND APPARATUS FOR REPRODUCING RECORDED INFORMATION

[76] Inventor: Hiroshi Yamamoto, 14-11, Shimotakaido 4-chome, Suginami, Tokyo, Japan

[22] Filed: July 8, 1974

[21] Appl. No.: 486,455

[52] U.S. Cl. ............................... 274/9 R; 274/9 B; 274/39 A
[51] Int. Cl.² .......................................... G11B 25/04
[58] Field of Search ............. 274/9 A, 9 B, 1 A, 9 R

[56] References Cited
UNITED STATES PATENTS

| | | | |
|---|---|---|---|
| 3,432,168 | 3/1969 | Kingsbury | 274/9 A |
| 3,561,768 | 2/1971 | Castagna | 274/9 B |
| 3,773,331 | 11/1973 | Watanabe | 274/1 A |

Primary Examiner—Richard E. Aegerter
Assistant Examiner—A. Jason Mirabito
Attorney, Agent, or Firm—Wenderoth, Lind & Ponack

[57] ABSTRACT

A method of and an apparatus for reproducing information recorded on a thin sheet with no central hole for placing the sheet in position, in which a plurality of switches are provided, at least one of which can be closed if there is a sheet present on a turntable and the other of which can be closed if a lid is completely lowered. A pickup arm is provided with a reproducer stylus and can be moved to the starting point when the lid is raised, so that actuating both switch means can cause the motor circuit to be closed for driving the turntable for rotation, and reproduction can be repeated by operating the lid.

8 Claims, 7 Drawing Figures

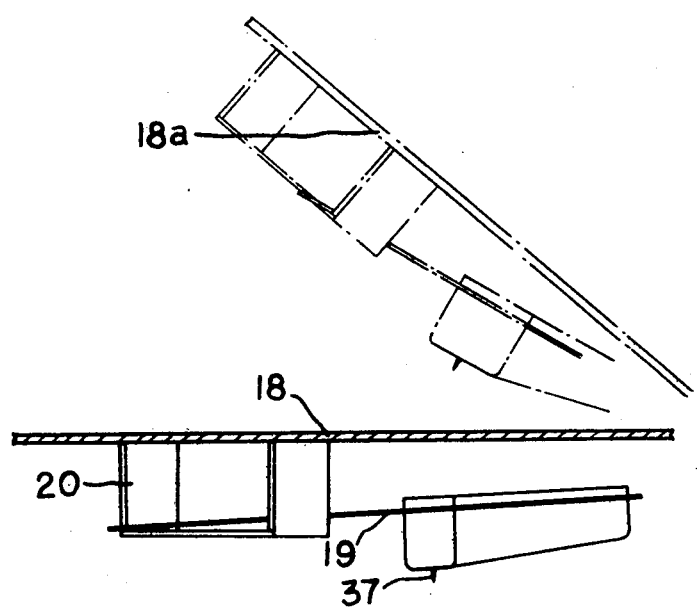

METHOD OF AND APPARATUS FOR REPRODUCING RECORDED INFORMATION

BACKGROUND OF THE INVENTION

Conventional reproducing machines are mainly classed into two types, one being of a type that reproduces a recorded sound by rotating a record or sheet, and the other being of a type that reproduces a recorded sound by rotating a reproducer stylus or the like with a record or sheet stationary. These machines generally use a record or sheet with a spiral groove which is played back for a relatively long time. Therefore, the machines are not suitable when a playback of a relatively short time is required.

Nowadays, demands are increasing for records or sheets of a short time of reproduction which contain information such as words or phrases for the purpose of learning a foreign language and which are used as word books.

The present invention provides a useful means of reproducing such information recorded on a sheet which has a width of recorded area between, e.g. an outer diameter of 40 mm and an inner diameter of 15 mm, and therefore of a reproducing time of 30 seconds.

A sheet of small size and therefore of a short time of reproduction is provided according to the present invention, and is used for high speed rotation or 78 r.p.m. The sheet has no hole centrally thereof for placing it correctly on a turntable but is readily positioned and removed. A pickup arm with a stylus is automatically set at the starting point of the sheet. More particularly, a rod member is provided, which is adapted to move up and down and acts as a switch for detecting if a sheet is loaded or not. The rod member is normally in a projecting state, and in this state the sheet is placed on the turntable. The sheet is first inclined relative to the turntable as supported by the rod member and is therefore easy to catch or grasp by the operation. When a pivotted lid of the apparatus is lowered to a closed position, it presses down the sheet which also depresses the rod member, placing the sheet horizontally on the turntable and actuating a switch for a motor to drive the turntable.

A sheet provided according to the invention has no hole centrally thereof for positioning the sheet on the turntable. This makes it possible to use all the surface area of the sheet for visual information. As the sheet has no such hole, provision is made so that the corners or edges of the sheet are held by the peripheral portion of the turntable.

A conventional reproducing machine includes a mechanism of complicated construction which permits an automatic return of a pickup arm to its original position.

According to the present invention, however, a pivotted lid is provided with a frame member for supporting a head portion of a pickup arm, and a guide supporting frame which is located in a position where the head portion of the pickup arm receives a component force which moves the arm away from the center of the sheet when the lid is moved up. In this manner, the pickup arm is returned to its original position by its own weight when the lid is moved up.

As understood from the aforegoing, the present invention provides a very simplified means of returning the pickup arm to its original position.

BRIEF SUMMARY OF THE INVENTION

This invention relates to a method of and an apparatus for reproducing information recorded on a thin sheet, and a method wherein a sheet has no hole centrally thereof for placing it in position on a turntable but can be placed correctly without difficulty, and a pickup arm is automatically set at the starting point of reproduction when a pivotted lid is lowered to a closed position and is also automatically returned to its original point when the lid is moved up.

As the sheet has no positioning hole, its positioning is made in the following manner: the sheet is first placed on the turntable such that it is inclined relative to the turntable as supported by a rod member, and is then held by the peripheral portion of the turntable when the lid is lowered.

An electric switch circuit is provided for starting or stopping a motor for the turntable, in which when the lid is lowered to a closed position, it depresses a switch to close the circuit for driving the motor and turntable. One end portion of the pickup arm is slidably supported by a frame member which permits an automatic return of the pickup arm so that the pickup arm is automatically placed at the starting point of reproduction when the lid is moved down and is automatically returned to the starting point when the lid is moved up.

It can easily be understood from the above that the sheet is placed correctly on the turntable by lowering the lid so that its playback can be repeated by operating the lid up and down since the pickup arm is such that it is automatically returned to its original position whenever the lid is moved up.

BRIEF DESCRIPTION OF THE DRAWINGS

FIG. 7 is a partly enlarged perspective view of the pickup arm which is seen to be returning to its original position.

DETAILED DESCRIPTION OF THE INVENTION

Figure 1:
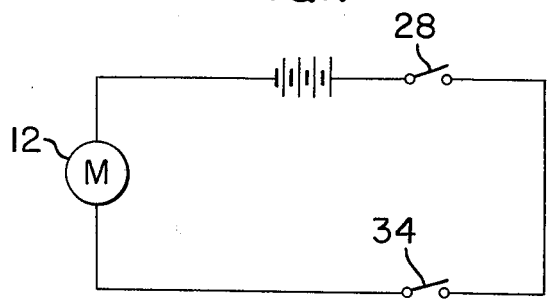
FIG. 1 is a circuit diagram for operation of a turntable motor and including two switches connected in series in accordance with the invention.

As has briefly been described heretofore, the present invention relates to a method of and an apparatus for reproducing a recorded information recorded on a thin sheet. According to the invention, a thin sheet carrying a recorded information has no hole centrally thereof for placing the sheet in position on the turntable, but can readily be placed and removed. A motor for the turntable is driven or stopped by operating a pivotted lid of the apparatus. When the lid is moved down to a closed position, a reproducer stylus is brought in contact with the starting point of a spiral groove of the sheet, and when the lid is moved up, the pickup arm is automatically returned to the starting point.

Now, the invention will further be described by way of examples only with reference to the accompanying drawings in which:

A case 1 is provided on which a turntable 2 is rotatably mounted on a horizontal plane. A guide member 4 is provided on an uppermost end plate 3 of the case 1 for guiding a sheet onto the turntable 2 and has one end thereof rigidly secured to the plate 3 and the other end thereof extending over the turntable 2. A rod member 6 is provided such that it passes through a hole provided centrally of a rotary shaft 5 of the turntable 2, and is adapted to move up and down. The lower end portion of the rod member 6 is such that it contacts one end of a lever 7, the other end of the lever 7 being rotatably connected to a member 9 provided on an intermediate plate 8 of the case 1. A lower end of spring means 10 is connected to the intermediate portion of the lever 7, the upper end of the spring means 10 being connected to one end of an arm member 11. The other end or base end of the arm member 11 is rigidly secured to an outer wall of a motor 12. The motor 12 is inclinably or rotatably supported by a bearing plate 13 which is rigidly secured to the intermediate plate 8, a shaft 14 of the motor 12 being capable of contact with a wheel 16 of elastic material fitted on a lateral wall 15 of the turntable 2.

A pickup arm 17 is mounted on one side of the uppermost end plate 3 such that it is rotated on its pivoted end horizontally and vertically.

A member 19 is provided for supporting a head portion of the pickup arm 17 and is supported by a guide frame member 20 provided on the underside of a pivoted lid 18. In this case, a line 24 drawn from the pivoted end of the pickup arm and that portion of the member 19 which is supported by the frame member 20 is biassed or inclined relative to the edge on which the lid 18 is pivotted, in a direction away from the center of the turntable.

A cylindrical member 21 is rotatably provided on the underside of the lid 18, and is located opposite the rod member 6. The member 21 has a hole 23 centrally thereof for insertion of the head portion of the rod member 6. When a sheet 22 is not loaded or the lid 18 is closed with the sheet 22 not loaded, the rod member 6 is biased to a projecting state by spring means 10 and is received and held by the hole 23, so that rotation of the turntable is thereby locked.

Figure 4:
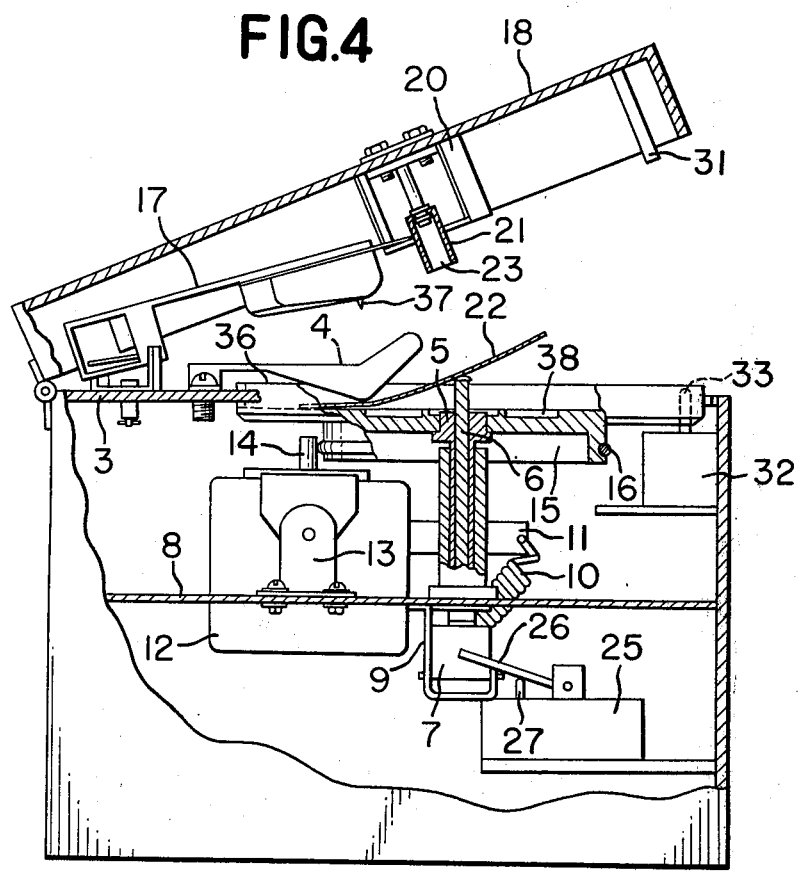
FIG. 4 is a partly sectional front view of the apparatus with the lid in an open position.

According to the apparatus illustrated so far, a sheet 22 is loaded between the guide member 4 and the surface of the turntable 2. It is partially supported by the rod member 6 which extends upwardly as indicated by the solid line in FIG. 4. This helps the sheet 22 to be easily caught or grasped by the operator.

Figure 3:
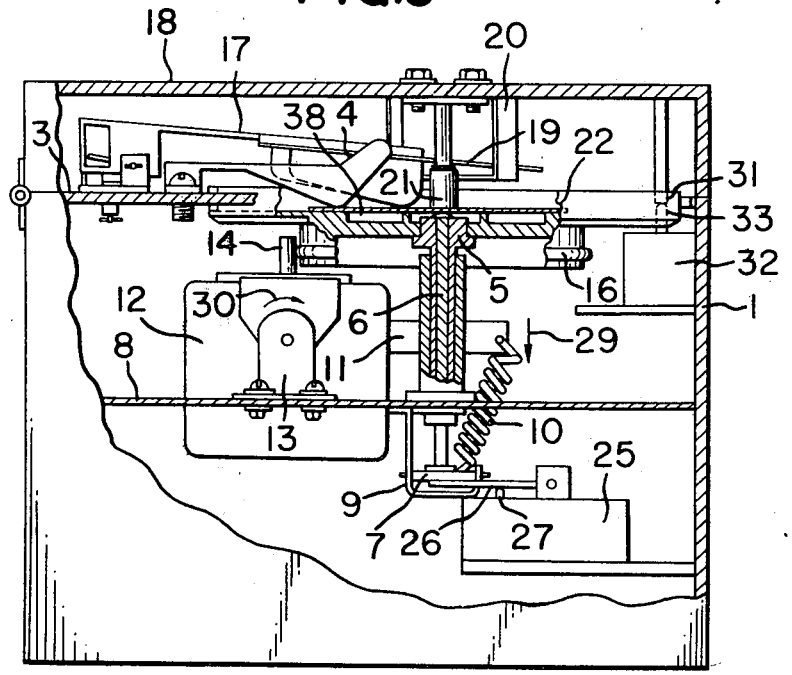
FIG. 3 is a partly sectional front view of the apparatus with the lid in a closed position.
Figure 5:
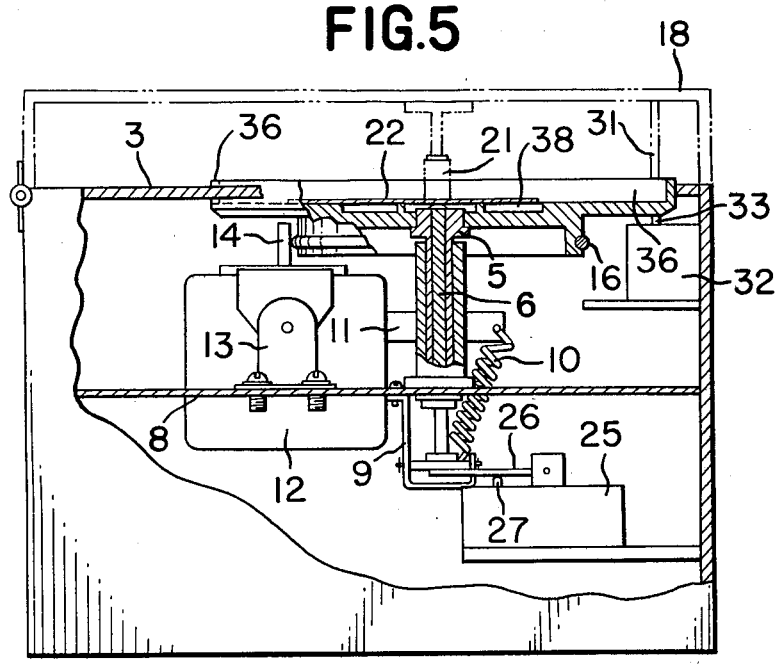
FIG. 5 is a front view, partly broken away, of the apparatus in which the lid and the pickup arm are not shown for the convenience of explanation.
Figure 6:
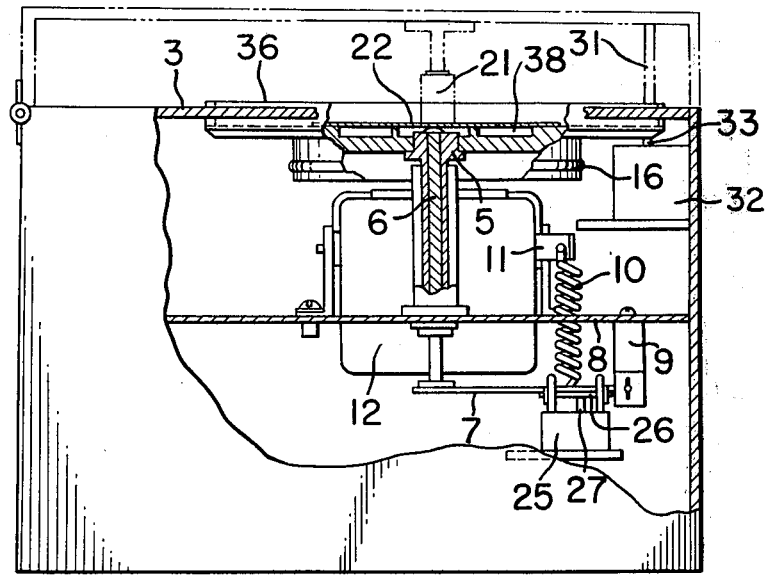
FIG. 6 is a side view, partly broken away, of the apparatus in which lid and the pickup arm are not shown for the convenience of explanation.

When the lid 18 is lowered to a closed position, the cylindrical member 21 presses down the sheet 22 which then depresses the rod member 6. The sheet 22 is thus placed in a horizontal position on the turntable 2 as indicated in FIG. 3. In this case, the corners of the sheet 22 are securely held by the peripheral inner wall 36 of the turntable 2. This eliminates the need of providing a hole centrally of the sheet 22 for ensuring proper positioning thereof on the turntable 2. When the rod member 6 is depressed, it presses down the end portion of the lever 7 to move the lever 7 down which presses down an operative rod member 26 of a micro switch 25. When the rod member 26 is lowered, it pushes down a projecting portion 27 of the micro switch 25 which turns on a switch 28 (see FIG. 1) to close a circuit for the motor 12. In this case, when the lever 7 is lowered, the head portion of the arm member 11 is pulled down by spring means 10 as indicated by the solid line arrow 29, so that the motor 12 is moved toward the direction 30 as indicated by the solid line arrow, and the shaft 14 of the motor 12 is by pressure brought in contact with the wheel 16 of elastic material. When the lid 18 is lowered to a closed position, its free end edge touches the respective opposite edge of the case 1. Then, a projecting portion 31 provided on the lid 18 depresses a portion 33 of a switch 34 which actuates the switch 34 to close the circuit for the motor 12. At this moment, the circuit is closed to start the motor 12 which then rotates the turntable 2, with which the sheet 22 is turned for reproduction.

Figure 2:
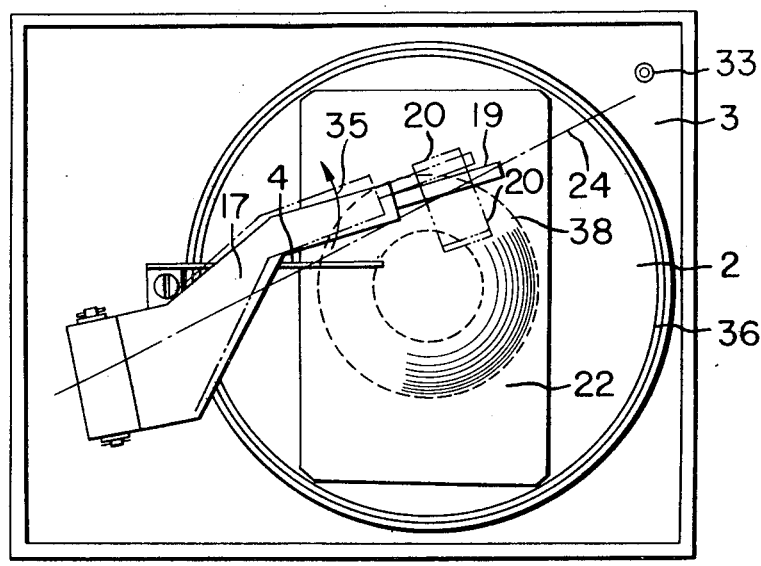
FIG. 2 is a plan view of an apparatus embodying the present invention in which the pivotted lid thereof is not shown for convenience of explanation.

Next, when the lid 18 is moved up to an open position at the end of the reproduction or during the reproduction, the portion 33 of the micro switch 32 is released or moved away from the projecting portion 31 of the lid 18 so that the switch 34 is turned off to open the circuit, and the member 21 is moved away from the rod member 6 which is released from the member 21 and moved up by spring means 10 to turn off the switch 28 of the micro switch 25 and stop the motor 12. Rotation of the turntable 2 is thus stopped. The guide frame member 20 is moved up as the lid 18 is moved up, thus also lifting the pickup arm 17 which is then moved by its own weight in the direction as indicated by the solid line arrow 35 in FIG. 2 and returned to its original or starting position. This return of the pickup arm 17 is carried out by a component force which the member 19 receives to move the arm 17 away from the center of the sheet 22 when the lid 18 is moved up. This, therefore, eliminates such mechanism as illustrated above for supporting the pickup arm 17, but it may be such that the pickup arm is only moved away from the center of the sheet when the lid 18 is moved up. In other words, the pickup arm 17 may be placed parallel to the pivotted edge of the lid 18.

A spiral groove 38 is provided in a position of the turntable 2 corresponding to the range of movement of the stylus 37 in order to protect the surface of the turntable 2 from damage that may occur due to the contact of the stylus 37 when the sheet 22 is not loaded.

The cylindrical member 21 is moved away from the rod member 6 as the lid 18 is moved up so that the member 6 is released from the pressure of the member 21 to lift part of the sheet 22. Then, the corners of the sheet 22 on one side are removed from the peripheral inner wall of the turntable 2 and are easily caught or grasped by the operator for removal.

As has been illustrated heretofore, the present invention provides a sheet carrying a recorded information which has no hole centrally thereof but which can readily be placed in position on the turntable without such hole. The very absence of the hole from the sheet makes it possible to use all surface area of the sheet for visual information.

According to the invention, furthermore, there are provided a guide member extending over the turntable and adapted to guide a sheet onto the turntable, and a rod member adapted to move up and down and which normally extends upwardly so that the sheet can easily be caught or grasped by the operator for replacement.

According to the invention, a motor is switched on and off by operating the lid which depresses and releases the rod member, so that in case a sheet is not loaded or the lid is not completely closed, the circuit for the motor will not be actuated since it includes two switches connected in series. This provides a safety device for locking rotation of the turntable in such cases. As the shaft of the motor is brought in contact with the lateral wall of the turntable as the rod member is lowered, the turntable will receive rotation from the motor with certainty.

I claim

1. An apparatus for reproducing information recorded on a nonapertured rectangular thin sheet, said apparatus comprising:
    a cabinet;
    a lid pivotally connected to one edge of said cabinet;
    a turntable positioned at an upper portion of said cabinet and including means for grasping the four corners of a sheet;
    a motor including an output shaft and mounted for movement toward and away from said turntable;
    guide member means for slidably guiding a sheet onto said turntable;
    a rod member provided centrally of said turntable and normally biased upwardly therethrough;
    first and second switch means connected in series with each other and said motor thus forming circuit means for actuating said motor only when both said switch means are closed;
    said first switch means being provided on an edge of said lid and actuable only when said lid is completely lowered to a closed position thereof;
    said second switch means being provided below said rod member and actuated by downward movement of said rod member only if a sheet is positioned on said turntable;
    a cylindrical member rotatably connected to the underside of said lid at a position opposite said rod member and comprising means for pressing said sheet toward said turntable and for thus moving said rod member downwardly; and
    a pickup arm including a reproducer stylus.

2. An apparatus as claimed in claim 1, wherein said rod member has connected thereto spring means for moving said output shaft of said motor toward and away from an edge wall of said turntable in accordance with downward and upward movement of said rod member.

3. An apparatus as claimed in claim 1, wherein said pickup arm has a base end thereof connected to a top plate of said cabinet and a head portion supported by a guide frame member provided at the underside of said lid; and a line extending from said base end toward said head portion being biassed relative to said edge on which said lid is pivotted, in a direction away from the center of said turntable.

4. An apparatus as claimed in claim 1, wherein said means for grasping the four corners of a sheet comprises a groove provided on the peripheral inner wall of said turntable, and an inwardly extending projection.

5. An apparatus as claimed in claim 1, wherein said guide member means includes a base end rigidly secured to a top plate of said cabinet, and a head portion extending toward the center of said turntable and having a downwardly extending portion close to the surface of said turntable.

6. An apparatus as claimed in claim 1, wherein said cylindrical member has an aperture therein comprising means for the receipt of the upper portion of said rod member if said lid is lowered to the closed position with no sheet present on said turntable.

7. A method of reproducing information recorded on a nonapertured thin sheet, said method comprising:
    first placing a sheet on a turntable such that said sheet is inclined relative to said turntable and corners of said sheet are held by a peripheral inner wall groove of said turntable;
    lowering a pivotted lid to a closed position and contacting said sheet to move said sheet into a horizontal position on said turntable;
    moving a reproducer stylus to a reproduction starting point of said sheet when said lid is completely lowered; and
    closing a first switch means only if a sheet is present on said turntable;
    closing a second switch means when said lid is completely lowered; and
    starting said motor circuit only if both said first and second switch means are closed.

8. A method as claimed in claim 7, wherein said step of moving said reproducer stylus comprises moving a pickup arm carrying said reproducer stylus to a starting position by raising said lid, whereby said reproducer stylus can be repeatedly returned to said starting point by moving said lid up and down, such that information on a given sheet may be repeatedly reproduced.

* * * * *